United States Patent Office 3,455,821
Patented July 15, 1969

3,455,821
APPARATUS FOR TREATING SLURRIES OR GASES WITH SCREEN OR FILTER SURFACES UNDER PRESSURE
Toivo Ensio Aremaa, Karhula, Finland, assignor to A. Ahlstrom. Osakeyhtio, Moormarkku, Finland, a corporation of Finland
Filed Jan. 25, 1965, Ser. No. 427,662
Claims priority, application Sweden, Feb. 1, 1964, 1,270/64
Int. Cl. B01d 29/20
U.S. Cl. 210—414      2 Claims

ABSTRACT OF THE DISCLOSURE

The method and apparatus treats fluid materials such as slurries, gases, or the like, in a closed system under a controlled over-pressure. The system has screen, or filter, surfaces therein and includes means within it for imparting a reciprocating movement to the material components flowing through the screen or filter surfaces. The pressure control enables the pressure difference between the two sides of the screen, or filter, surface to be adjusted to a difference most favorable for the treatment. The reciprocating motion may have a short enough amplitude and a high enough frequency to be of a vibratory nature.

---

The pressure screens as utilized for instance in the paper industry, are provided with high speed rotating so-called hydrofoil blades, which generate a suction effect, for the purpose of preventing blocking of the screen surfaces. Since the peripheral velocity of the said blades must be considerable, such a screen is a great power consumer. Furthermore, a screen like this is expensive, since its manufacture is a precision job. Moreover, the device is easily damaged in case any hard bodies, such as stones or metal particles inadvertently find their way between the said blades and the screen surfaces.

Continuously operating filters generally are of an open structure, which results in a small capacity, since only the hydrostatic head and thus only a small pressure difference can be utilized in the same. In addition, the material to be treated can for instance not be pumped upward through the filter directly to the next treating step.

It has also been suggested to make use of devices, which include membrane plates having a reciprocating movement, between the screen or filter surfaces, by means of which plates the liquid slurry is given a fast reciprocating movement. In these devices the membrane plates move an accurately defined distance at each stroke, controlled with excenter axles and bearings. As a result these devices cannot be utilized in cases where the number of strokes per minute is high. Such membrane plate equipped screen surfaces often are arranged in tanks provided with an overflow or corresponding means, in which case a slight pressure can be exerted on the devices. This kind of device however cannot be utilized for treating gases.

The object of this invention is to provide a method and an apparatus by means of which the above mentioned drawbacks can be eliminated and which is applicable to continuous screening, thickening and washing of slurries, filtering of liquids, air and gasses and to similar treatment of slurries, gasses and other fluids in a closed treating system with screen or filter surfaces, utilizing the optimum pressure difference.

The method of the invention for treating fluid materials such as slurries, gasses or the like, flowing in a treating system equipped with screen or filter surfaces, in which method the material components flowing through the screen or filter surfaces are given a reciprocating movement through the screen or filter surfaces by means of freely reciprocating elements, is primarily characterized in that the materials are treated in a closed system under a controllable overpressure.

The apparatus of the invention, comprising reciprocating membrane plates or similar elements fitted adjacent the screen or filter surfaces parallel to the same, is primarily characterized in that the screen or filter elements and the reciprocating membrane plates or similar elements are fitted in a closed tank, provided with an inlet for the material to be treated, and a controllable outlet for each treated material component in order to bring about and maintain values of the overpressure and the pressure difference between the two sides of the screen or filter surfaces, most favourable for the treatment.

According to the invention the material is treated in a fully closed system under pressure and the apparatus is intended to work under an inner overpressure (up to 3 kp./cm.$^2$ (42 p.s.i.g.)), brought about by a pump or corresponding means. Thereby the following advantages are achieved compared with open systems:

(a) It is possible to treat gaseous materials.

(b) Air is prevented from being entrained with the material to be treated. For instance when treating chemical wood pulp containing air, the air contained in the pulp will cause disadvantageous foam formation.

(c) The different components of the treated material can be directed to the next treatment step directly through pipes without intermediate open tanks with liquid level controllers and pumps.

(d) The apparatus can for instance be located on the ground floor in a building, and the different component materials can be directed upwards or over considerable distances without a special pump.

The invention is described in more detail in the following with reference to the accompanying drawings, which by way of examples of the possible applications of the invention illustrate two different embodiments of the pressure screen according to the invention, in which drawings FIG. 1 is a cross section of a pressure screen according to the invention, along the line I—I of FIG. 2.

Figure 1:
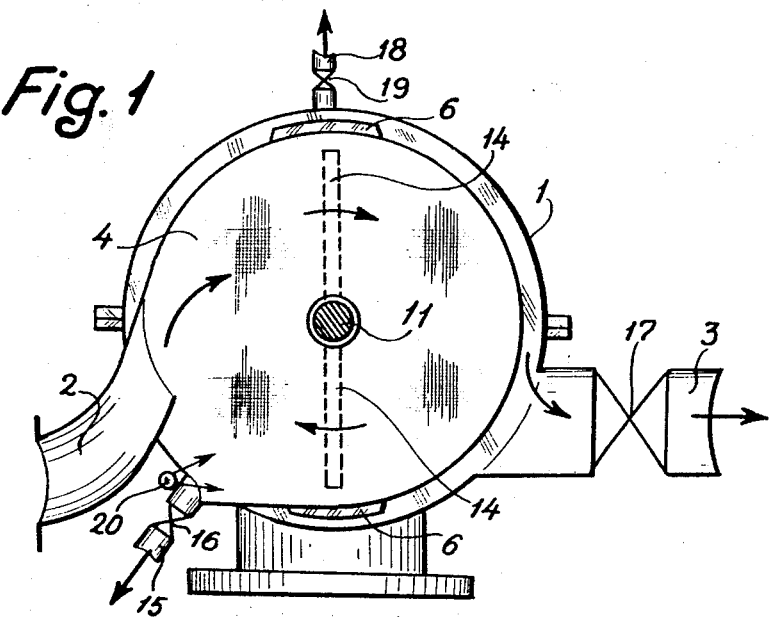
Figure 2:
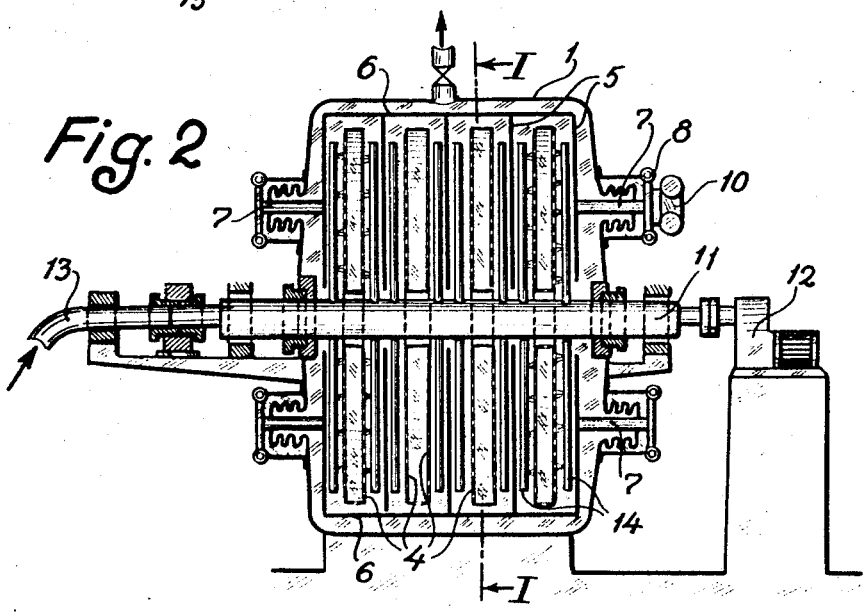
FIG. 2 shows the pressure screen in longitudinal section.

The pressure screen shown in the drawings comprises a pressure resisting cylindrical screen housing 1, having an inlet opening 2 for unscreened stock and an outlet opening 3 for screened stock. In the screen housing are situated in spaced parallel relationship and at right angles to the axis of the screen housing, annular screen plates 4, provided either with slots or circular perforations. The screen plates are attached to the screen housing and so connected to the inlet 2 and the outlet 3, that the said inlet and outlet communicate only through the screen plates, so that impurities and similar particles cannot follow with the screened stock, and are rejected. In this embodiment of the invention the screen plates are pairwise connected together forming an annular space connected to the inlet 2 of the screen housing.

According to the invention five rigid membrane plates 5 are fitted inside the screen housing so as to have one membrane plate at each side of each pair of screen plates in parallel spaced relationship to the same. The membrane plates are attached to two fastening plates 6, situated at different sides of the plates, in such a manner that the membrane plates and the fastening plates constitute a rigid element. This element is supported at each end by two support shafts 7, situated diagonally opposite each other and in turn journaled resiliently in a supporting rubber 8, supported by the screen housing, and connected by means of tightening pressure membranes 9. One of the support shafts 7 is further connected to a motor driven vibrating means 10, giving all the support shafts and thus all the membrane plates a reciprocating axial movement. The length of the stroke is for instance 3–7 mm. (0.12–0.25″) and the frequency 1000–3000 strokes per minute.

The pressure screen is further provided with a tubular shaft 11 situated axially at the center, which shaft at each end is rotatably supported by the screen housing, and connected to the same in a pressure tight manner by means of suitable packagings. The tubular shaft is at one end connected to a gear motor 12 and at the opposite end to a pipe 13 for feeding in water or steam. The tubular shaft is provided with radially extending spray pipes 14, directed in opposite directions. In this case these pipes are fitted so as to provide one spray pipe extending freely between each membrane plate and each screen plate. Each spray pipe communicates with the inner portion of the tubular shaft 11 and thus also with the inlet pipe 13.

The screen housing is further provided with an outlet opening 15 for rejected stock, fitted at the bottom of the housing and provided with a control valve 16. The outlet opening 15 communicates only with the inner space of each pair of screen plates. A control valve 17 is fitted to the outlet opening 3 for the accepted stock discharge. At the upper part of the screen housing is fitted a vent 18 for air discharge, provided with a valve 19. When required, a water spray 20 can be fitted adjacent the outlet opening 15.

The stock to be screened is continuously pumped through the pressure screen and the stock flow rate is controlled by means of the control valves 16 and 17 so as to maintain a continuous overpressure in the pressure screen. During the entire treating time the membrane plates are kept at the vibrating movement, which produces alternatingly a pressure wave, which loosens the knot stock accumulated to the filter or screen surfaces blocking the same, and thus effectively keeps the surface free, and a suction effect, which contributes to the passage of the slurry or gasses not yet treated, situated at the inlet sides of the screen or filter surfaces through the said surfaces freed during the preceding pressure wave from blocking particles. The rotating spray pipes also contribute to the cleaning of the screen surfaces and prevent thickening of the stock during screening. In case air is entrained with the stock into the housing, the air is removed for instance discontinously through valve 19.

Figure 3:
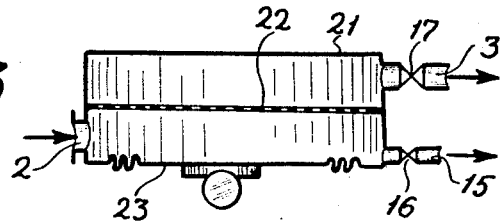
FIG. 3 shows a cross section of another embodiment of the pressure screen.

The method according to the invention is applicable for several different purposes and thence the pertinent apparatus can vary considerably as to its construction and form. The membrane plates can be made of rubber or other resilient material instead of rigid plates. The membranes can then be attached at their edges to the screen or filter surfaces and their stiffened middle portions be connected to the vibrating means. The membrane plate can also partially be constituted by the housing shell itself. Such an embodiment is schematically shown in FIG. 3. In this figure the closed treatment tank is designated with reference number 21, the screen plate fitted into it with 22 and the membrane plate to be vibrated with 23. In cases where the material to be treated is of a quanlity that makes the spray pipes unnecessary, the spray pipes and belonging parts may be omitted. The screen or filter surfaces as well as the membrane plates can in this case be cylindrical in form and fitted co-axially inside each other, so as to provide axially extending flow channels with annular cross sections. In this case such vibrating means are utilized, which provide a vibration of annular form.

In the embodiment described above the vibration movement is brought about by means of membrane plates fitted inside the screen housing. It is evidently possible instead of this solution to fit suitable vibrating means for instance to the outlet of accepted stock, which elements bring the stock in the screen housing from the outlet on into said vibrating movement.

It is also evident, that membrane plates with the same effect can be fitted to the inlet side of the screen or filter plates. The frequency of the membrane plates is selected in casu and the movement of the membrane plates can also be arranged to be discontinuous.

What we claim is:

1. Apparatus for treating materials such as slurries, gases, and the like, flowing in a treating system which comprises, a closed housing, a plurality of members formed with screen surfaces positioned within said housing, a plurality of membrane plate members arranged adjacent said screen surfaces coaxial with, substantially coextensive in cross-section with and parallel to the same, means for reciprocating said membrane plate members to cause reciprocating flow of the material within said housing through said screens, inlet means for the material to be treated and controllable first outlet means for removing one treated material from one side of each screen surface and controllable second outlet means for removing a second treated material component from the other side of each screen surface whereby the over-pressure within the housing and the pressure difference between the sides of the screens most favorable for treatment may be established and maintained.

2. Apparatus as in claim 1 and including vibratory means in operable connection with said reciprocating plates in order to cause vibration of said plates in a direction deviating substantially from the planes of the screen surfaces.

References Cited

UNITED STATES PATENTS

| | | | |
|---|---|---|---|
| 1,762,560 | 6/1930 | Morton | 210—433 X |
| 2,932,402 | 4/1960 | Logue et al. | 210—383 |
| 2,988,224 | 6/1961 | Green | 210—383 X |
| 3,317,050 | 5/1967 | Daman | 210—388 X |

MICHAEL E. ROGERS, Primary Examiner

U.S. Cl. X.R.

210—19, 433; 55—96, 294